US012607731B2

(12) United States Patent  (10) Patent No.: US 12,607,731 B2
Kirsch et al.  (45) Date of Patent: Apr. 21, 2026

(54) METHOD AND CONTROL DEVICE FOR RECOGNIZING AN OBJECT IN A SURROUNDINGS OF A VEHICLE

(71) Applicant: Robert Bosch GmbH, Stuttgart (DE)

(72) Inventors: Andrea Kirsch, Stuttgart (DE); Katharina Maria Nerz, Weil der Stadt (DE); Kathrin Klee, Stuttgart (DE); Timo Winterling, Stuttgart (DE); Ulf Rueegg, Stuttgart (DE); Wilhelm Christopher Von Rosenberg, Stuttgart (DE); Stefan Lang, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 582 days.

(21) Appl. No.: 17/029,951

(22) Filed: Sep. 23, 2020

(65) Prior Publication Data

US 2021/0088641 A1    Mar. 25, 2021

(30) Foreign Application Priority Data

Sep. 25, 2019    (DE) ..................... 10 2019 214 612.0

(51) Int. Cl.
*G01S 7/539*    (2006.01)
*G01S 15/931*    (2020.01)
(52) U.S. Cl.
CPC ............ *G01S 7/539* (2013.01); *G01S 15/931* (2013.01)
(58) Field of Classification Search
None
See application file for complete search history.

(56) References Cited

U.S. PATENT DOCUMENTS

| 10,468,062 | B1 * | 11/2019 | Levinson | .............. G01S 13/867 |
| 2006/0251293 | A1 * | 11/2006 | Piirainen | ........... B60R 21/01512 |
| | | | | 382/104 |
| 2009/0267797 | A1 * | 10/2009 | Kim | ........................ G01S 7/539 |
| | | | | 340/932.2 |

(Continued)

FOREIGN PATENT DOCUMENTS

| CN | 105205500 A | 12/2015 |
| DE | 10 2006 028 214 A1 | 12/2007 |

(Continued)

OTHER PUBLICATIONS

Animal Echolocation, Wikipedia, p. 1, Para 2 (Year: 2008).*

(Continued)

*Primary Examiner* — James R Hulka
*Assistant Examiner* — Vikas Atmakuri
(74) *Attorney, Agent, or Firm* — Maginot, Moore & Beck LLP

(57) ABSTRACT

A method recognizes an object in a surroundings of a vehicle. The vehicle has an ultrasonic sensor for monitoring the surroundings of the vehicle and for the transmission and reception of ultrasonic signals. In the method, sensor data generated by the ultrasonic sensor are received. Classification data that contain features to be classified, are subsequently generated from the sensor data. The classification data and/or the sensor data are hereupon entered into a classifier that has been trained with training data for assigning the classification data and/or the sensor data to object classes. Object information that indicates at least one of the object classes is output.

14 Claims, 2 Drawing Sheets

(56) References Cited

U.S. PATENT DOCUMENTS

| | | | |
|---|---|---|---|
| 2013/0127262 A1* | 5/2013 | Roser .................. | H02H 1/0007 |
| | | | 307/326 |
| 2016/0321926 A1* | 11/2016 | Mayer ................. | G08G 1/0129 |
| 2018/0074194 A1* | 3/2018 | Jones ...................... | G01S 11/14 |
| 2018/0081046 A1* | 3/2018 | Banko ..................... | G01S 7/539 |
| 2018/0293445 A1* | 10/2018 | Gao ....................... | B60W 30/09 |
| 2018/0314921 A1* | 11/2018 | Mercep ............... | G06K 9/6289 |
| 2019/0162848 A1* | 5/2019 | Yuasa .................... | G01S 15/89 |
| 2019/0258251 A1* | 8/2019 | Ditty ...................... | G06V 20/58 |
| 2019/0258878 A1* | 8/2019 | Koivisto ............... | G06V 10/25 |
| 2019/0265714 A1* | 8/2019 | Ball ....................... | G06N 3/0454 |
| 2019/0294966 A1* | 9/2019 | Khan ..................... | G06V 10/82 |
| 2020/0034785 A1* | 1/2020 | Romano ................ | G06V 20/00 |
| 2020/0082248 A1* | 3/2020 | Villegas ................... | G06N 3/08 |
| 2020/0103499 A1* | 4/2020 | Preece .................. | G06N 3/045 |
| 2020/0130685 A1* | 4/2020 | Nguyen .............. | B60W 60/001 |
| 2020/0202168 A1* | 6/2020 | Mao ......................... | G06N 3/08 |
| 2020/0209882 A1* | 7/2020 | Kashi ................... | G10K 11/178 |

FOREIGN PATENT DOCUMENTS

| | | |
|---|---|---|
| DE | 100 18 807 B4 | 5/2012 |
| DE | 10 2011 088 401 A1 | 6/2013 |

OTHER PUBLICATIONS

What is Sonar?, https://web.archive.org/web/20180919144637/https://
oceanservice.noaa.gov/facts/sonar.html (Year: 2018).*

* cited by examiner

METHOD AND CONTROL DEVICE FOR RECOGNIZING AN OBJECT IN A SURROUNDINGS OF A VEHICLE

This application claims priority under 35 U.S.C. § 119 to patent application no. DE 10 2019 214 612.0, filed on Sep. 25, 2019 in Germany, the disclosure of which is incorporated herein by reference in its entirety.

The disclosure relates to a method for recognizing an object in a surroundings of a vehicle, a corresponding control device and a corresponding computer program product.

BACKGROUND

It is important in connection with driver assistance systems, in particular with autonomous driving, that relevant objects in the near region of a vehicle, i.e. other traffic participants such as pedestrians, cyclists, passenger cars or trucks, or possible obstacles such as fences or pillars, are reliably recognized. An accurate acquisition of the situation in the region close to the vehicle is above all necessary when starting, parking or changing lane.

The use of ultrasonic sensors for acquisition of the region close to the vehicle is known. These have a high sensitivity, extending even to the range of a few centimeters, and thus enable a seamless acquisition of the region close to the vehicle.

DE 10 2006 028 214 A1 shows, by way of example, a possible structure of an ultrasonic sensor for use in a motor vehicle.

Ultrasonic sensors are usually used to measure a distance from possible obstacles in the region close to the vehicle. If the vehicle approaches an obstacle too closely it is also, for example, possible for a visual or audible warning to be given to the driver. The driver is thus warned before impact with obstacles, in order to avoid damage to the vehicle.

An ultrasonic distance measuring device for an electronic parking aid is, for example, disclosed in DE 100 18 807 B4.

Systems for entering and leaving parking spaces that survey a parking space with ultrasonic sensors and can calculate a corresponding trajectory for entering or leaving the parking space for (semiautomatic) entering and leaving are furthermore known.

SUMMARY

Against this background, a method is presented for detecting an object in a region close to a vehicle, as well as a control device and a computer program product for carrying out such a method, with the approach presented here. Advantageous developments and improvements of the approach presented here emerge from the description.

Forms of embodiment of the present disclosure make it possible in an advantageous manner to semantically qualify sensor data generated by the ultrasonic sensor of a vehicle into individual object classes such as are for example relevant for driver assistance systems or for autonomously driving systems. Conclusions can, for example, be drawn from the sensor data as to whether objects that have been acquired are pedestrians, passenger cars, trucks or other obstacles such as pillars. This permits a specific estimation of the situation of a close surroundings of the vehicle, and extends the range of applications of ultrasonic systems existing at present that are employed predominantly for distance measurement.

Such a classification delivers additional findings going beyond a pure yes/no detection of possible obstacles, which can contribute to a given driving situation being acquired more precisely and reliably, and shortening reaction times.

A first aspect of the disclosure relates to a method for detecting an object in a surroundings of a vehicle, wherein the vehicle comprises an ultrasonic sensor for monitoring the surroundings of the vehicle for transmitting and receiving ultrasonic signals, wherein the method comprises:

generating classification data that contains features to be classified from the sensor data;

entering the classification data and/or the sensor data into a classifier that has been trained using training data for assigning the classification data and/or the sensor data to object classes; and outputting object information that indicates at least one of the object classes.

The method can, for example, be implemented in software or hardware, or in a mixed form of software and hardware, for example in a control device.

A second aspect of the disclosure relates to a control device that is implemented in order to carry out a method as is described above or below.

A third aspect of the disclosure relates to a computer program or computer program product with program code that can be stored on a machine-readable carrier or a machine-readable storage medium such as, for example, a semiconductor store, hard disk store or optical store, and which can carry out the method as is described above and below when the computer program (product) is executed on a computer or a control device.

Ideas related to forms of embodiment of the present disclosure can, inter alia, be deemed to be based on the thoughts and findings described below.

Ultrasonic signals can, for example, be recorded by way of sensor arrays that can be mounted at the vehicle on the front, rear and/or side. An ultrasonic system generally comprises transmitting and receiving sensors through which the transit times between the transmission of an ultrasonic pulse and the reception of a portion of this ultrasonic pulse reflected by an object, also known as the echo, can be measured. The receiving and transmitting sensors can be different from one another or can be identical to one another. If an echo is received by a plurality of sensors, for example at least three, then a position of the reflecting point can be determined through triangulation or multilateration of the transit paths. Such a sensor array can be realized in one or two rows, for example with an upper and a lower row of sensors. A two-row sensor array has the advantage that in addition to an x-position and a y-position, a z-position of the reflecting point, i.e. its height relative to the vehicle, can be calculated.

Briefly summarized, features that are relevant for the desired object classes are extracted step-by-step from sensor data of an ultrasonic sensor, i.e. from the ultrasonic signals contained therein, using the approach presented here. As a result, a highest possible sensitivity and a lowest possible error rate can be achieved in a subsequent classification of the ultrasonic signals. A selection of such features is presented below. Pre-processed echo data such as echo distances, or position data, such as data relating to trilaterated reflection points, or a combination of echo and position data, can for example be used as inputs for the classification.

The classification can, for example, be used for distinguishing the heights of objects. In particular, the classification can involve a semantic classification of object types such as passenger car, automobile, curbstone, bar or the like.

In addition to or as an alternative to the classification data, the sensor data can be entered directly into the classifier, for example in order to recognize interfering ultrasonic signals from the surroundings of the vehicle that are contained therein.

In ultrasonic systems presently in use for driver assistance systems or systems for (partially) automated driving, an ultrasonic signal transmitted by the vehicle's own ultrasonic sensor, and a reflected portion of this ultrasonic signal are used for evaluation. Passive ultrasonic signals that do not originate from the ultrasonic sensor are usually treated as interfering signals. The approach presented here makes it possible to use such passive ultrasonic signals from the surroundings of the vehicle also for object recognition by means of classification. In this way the surroundings of the vehicle can be interpreted to a greater extent than when only echoes from actively transmitted ultrasonic signals are used. For example, a detailed and nevertheless robust object representation can thus take place on the basis of the knowledge of which echoes belong to which interfering ultrasonic signals, or on the basis of a distinction between trucks, passenger cars and building site vehicles.

Noises in the surroundings of the vehicle can have a characteristic ultrasonic component and can thus be detected by the ultrasonic sensor. Such a noise, such as the venting sound of a compressed air brake or the rolling sound of tires on wet or dry roads can be an obstacle to the evaluation of echoes of actively transmitted ultrasonic signals. The characteristic of such interfering ultrasonic signals can, however, also be used to carry out a semantic classification. For this purpose the sensor data are used as the input for an appropriately trained classifier. It is thus for example possible to recognize whether a truck is nearby or whether the road is wet or dry on the basis of a classified ultrasonic interfering signal.

A vehicle can refer here to a motor vehicle such as a passenger car, truck, bus or motorcycle.

The sensor data can contain a reflected component, also referred to as echoes, of ultrasonic signals that were originally transmitted by the ultrasonic sensor. The sensor data can on the other hand contain interfering ultrasonic signals that do not originate from the ultrasonic sensor but that were detected by it.

Classification data can refer to pre-processed input data for the classifier. The classification data can accordingly comprise features suitable for classification extracted from the sensor data. For example, the classification data can contain echo data that describe the echoes of transmitted ultrasonic signals or position data that describe the reflection sites at which the echoes were reflected, or a combination of echo and position data. The echo data can be generated from the sensor data. The position data can be generated from the echo data and/or the sensor data.

A classifier can refer to an algorithm for assigning input data to specific object classes, i.e. for classification of the input data. The following object classes are, for example, possible: pedestrian, truck, passenger car, pillar, fence, wall, object that can be driven over, object that cannot be driven over, passive interfering signal, dry road, wet road, or the like.

In the simplest case, a classifier can be a comparison between an input and a definition, wherein an output of the classifier indicates an agreement of the input with the definition. In particular, the classifier can comprise a machine-learning algorithm based on labelled data trained through supervised learning.

The classifier can, for example, be realized as a Bayes classifier, a support vector machine (SVM), a k-nearest-neighbor algorithm, a decision tree, a random forest, a multilayer perceptron (MLP), a recurrent neural network (RNN), long short-term memory (LSTM) network, a convolutional neural network (CNN) or a combination of at least two of the said examples.

Object information can refer to an output of the classifier. The object information can for example indicate a most probable of a plurality of object classes weighted with probabilities by the classifier on the basis of the classification data and/or of the sensor data.

According to one form of embodiment, the classification data can contain echo data that describe the echoes of transmitted ultrasonic signals. In addition or as an alternative, the classification data can contain position data that describe the reflection sites at which echoes of transmitted ultrasonic signals were reflected.

The echo data can for example contain a transit time, a transit distance also known as the echo distance, an intensity also known as the echo amplitude, a transmitter and/or receiver identification, a significance, i.e. a parameter that describes a reliability of an echo, a trace probability that indicates the probability with which a current echo can be assigned to an earlier echo, and/or a trace identifier (trace ID).

A reflection site can refer to a location in the surroundings of the vehicle at which an ultrasonic signal transmitted by the ultrasonic sensor is at least partially reflected back to the ultrasonic sensor. Such a reflection site can, for example, be understood as a reflection point whose position can be calculated through triangulation and/or multilateration from the sensor data, or, more precisely, from the echo data of a plurality of receiving sensors.

According to one form of embodiment, the echo data can describe a transit distance and/or an intensity and/or a plausibility of the echoes. In addition or alternatively, the position data can describe coordinates calculated through trilateration and/or multilateration of the reflection sites and/or a plausibility of the reflection sites.

Transit distance can refer to a distance between a reflection site and the ultrasonic sensor. Intensity can refer to an amplitude of an echo. The plausibility of an echo or of a reflection site can refer to a probability with which a measured echo or a measured reflection site matches an echo to be expected or with a reflection site to be expected. Trilateration can refer to a measurement method in which, on the basis of measured distances from three reflection points, a position of a fourth point in space can be unambiguously determined. Multilateration can refer to a measuring method in which more than three distances are available for the determination of position.

The position data can, for example, describe two-dimensional and/or three-dimensional coordinates of reflection points in the surroundings of the vehicle. In addition or alternatively, the position data can describe measurement errors, variances, probabilities or measuring modes such as, for example, complete, horizontal or vertical trilateration.

According to one form of embodiment, the method can further comprise the reception of further sensor data that are generated by the ultrasonic sensor and the evaluation of the further sensor data together with the object information.

After the classification has been done, the object information can be used to better evaluate the ultrasonic signals transmitted by the ultrasonic sensor. The object information can, for example, indicate a passive interfering ultrasonic signal. This interfering ultrasonic signal can now be appropriately masked out in the signal processing of actively transmitted ultrasonic signals, or, more precisely, echoes of these ultrasonic signals. The recognition of the surroundings of the vehicle on the basis of the transmitted ultrasonic signals thus continues to be possible. The recognition is, however, more robust, in so far as the field of view of the ultrasonic sensor does not have to be restricted at all or as much. More data, and more reliable data, are thus available for a potential data fusion and a potential planning of driving trajectories.

Through this form of embodiment it is, in other words, possible to evaluate sensor data of the ultrasonic sensor with the aid of the object information, i.e. of information relating to an object recognized in the surroundings of the vehicle. The object information can thus, for example, indicate an interfering ultrasonic signal in the surroundings of the vehicle, i.e. a passive ultrasonic signal. This information can advantageously be used to mask out the interfering ultrasonic signal in the evaluation of echo data, i.e. of reflected components of ultrasonic signals that were transmitted by the ultrasonic sensor. The robustness of the evaluation of echo data can thereby be increased.

According to one form of embodiment, the classification data can be generated repeatedly at defined time intervals, and a temporal progression of the classification data recorded. The temporal progression of the classification data can here be entered into the classifier. In addition or alternatively, the sensor data can be repeatedly received at defined time intervals, and a temporal progression of the sensor data recorded. The temporal progression of the sensor data can here be entered into the classifier. The classification data, or the sensor data, can for example be generated or received in a plurality of cycles. Through this form of embodiment, the reliability of the classification can be increased.

According to one form of embodiment, the classifier can have been trained using training data to recognize pedestrians, objects that can and/or cannot be driven over, interfering ultrasonic signals that do not originate from the ultrasonic sensor, a road condition, or for the recognition of at least two of the said object classes.

A differentiated distinction between objects that can be driven over, such as a rut, and objects that cannot be driven over, such as a child lying down, can, for example, contribute to significantly shortened reaction times.

According to one form of embodiment, the method can further comprise control of the vehicle and/or at least one component of the vehicle on the basis of the object information. The vehicle can, for example, be controlled on the basis of the object information in such a way that a collision of the vehicle with a recognized object is prevented. The vehicle can comprise actuators such as, for example, steering and/or brake actuators that are suitable for this purpose. The actuators can be controllable by an on-board computer of the vehicle. The on-board computer can, for example, comprise a control device such as is described above or below.

The control device can be an electronic device with at least one computing unit for processing data, at least one memory unit for storing data, and at least one interface for reading data in and/or outputting data. The computing unit can, for example, be a signal processor, what is known as a system-ASIC, or a microcontroller for processing sensor signals and outputting data signals depending on the sensor signals. The memory unit can, for example, be a Flash memory, an EPROM, or a magnetic memory unit. The interface can be designed as a sensor interface for reading the sensor signals from a sensor and/or as an actuator interface for outputting the data signals to an actuator. The interface can be designed as a communication interface for wireless and/or wired transmission of data. The interface can, for example, be one of a plurality of software modules on a microcontroller.

It is to be noted that some of the possible features and advantages of the disclosure are described here with reference to different forms of embodiment of the circuit board unit on the one hand and of the electronic module on the other hand. An expert will recognize that the features of the different devices can be combined, adapted or exchanged in a suitable manner in order to achieve further forms of embodiment of the disclosure.

BRIEF DESCRIPTION OF THE DRAWINGS

Forms of embodiment of the disclosure are described below with reference to the appended drawings, wherein neither the drawings nor the description are to be seen as restrictive for the disclosure.

The figures are only schematic, and are not true to scale. The same reference signs refer in the figures to features that are the same or that have the same effect.

DETAILED DESCRIPTION

Figure 1:
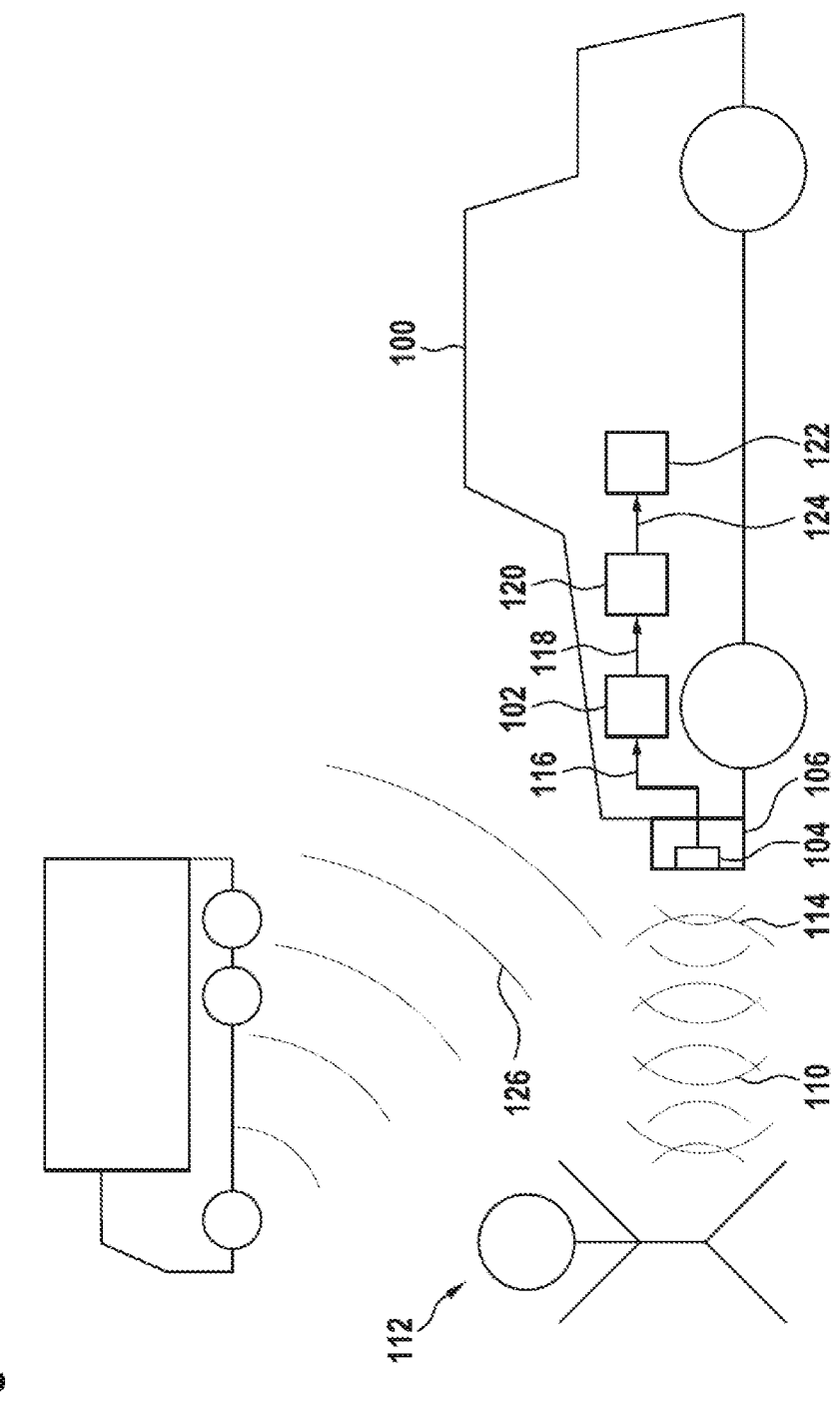
FIG. 1 shows schematically a vehicle with a control device according to one exemplary embodiment of the disclosure.

FIG. 1 shows schematically a vehicle 100 with a control device 102 according to one form of embodiment of the disclosure. The control device 102 is coupled to an ultrasonic sensor 104. The ultrasonic sensor 104, which is here installed by way of example in a front bumper 106 of the vehicle 100, is designed to monitor a relatively close surroundings of the vehicle 100. The ultrasonic sensor 104 transmits ultrasonic signals 110 for this purpose which are, for example, partially reflected from an object 112 in the nearby surroundings as an echo 114. The ultrasonic sensor 104 detects the echo 114 and sends corresponding sensor data 116 to the control device 102.

The ultrasonic sensor 104 can, alternatively, also be attached to a rear of the vehicle or at the side of the vehicle 100. It is also possible that the vehicle 100 comprises two or more ultrasonic sensors 104. The ultrasonic sensors 104 can here be arranged at different locations on the vehicle 100.

The ultrasonic sensor 104 can comprise at least three sensor units for transmitting the ultrasonic signals 110 and receiving the echo 114. For example, the ultrasonic sensor 104 can also be realized as a sensor array with a plurality of sensor units. The sensor units of the sensor array can be arranged in one, two, or more rows.

In this way it is possible to determine a distance or a position of the object 112 relative to the vehicle 100 through trilateration or multilateration of transit paths of the echo 114 received at different locations of the bumper 106, as described further above. In addition to the determination of the distance, a two-row or multi-row arrangement of the sensor units makes a determination of a height of the object 112 possible. The trilateration or multilateration takes place in the control device 102 through appropriate evaluation of the sensor data 116.

The control device 102 is also configured to extract features that are suitable for a semantic classification out of the sensor data 116, or more precisely from the echoes 114 contained therein. The extracted features serve as input data for an appropriately trained classifier, in particular, for example, a neural network. The classifier assigns the input data to one or a plurality of object classes, and outputs corresponding object information 118. In this example, the classifier assigns the input data to a "pedestrian" object class. The object information 118 accordingly indicates that the object 112 is very probably a pedestrian.

According to one exemplary embodiment, the control device 102 sends the object information 118 to an on-board computer 120 of the vehicle 100. The control device 102 can be realized as a component of the on-board computer 120. The on-board computer 120 and the control device 102 can be elements of a vehicle system for the (partially) automatic control of the vehicle 100. The on-board computer 120 is accordingly configured to use the object information 118 for the operation of at least one actuator 122 of the vehicle 100, such as perhaps a steering or braking actuator or a drive motor, or for operation of an engine control device of the vehicle 100. The actuator 122 is driven by a control signal 124 generated by the on-board computer 120 on the basis of the object information 118. In this example, the on-board computer 120 generates the control signal 124 in order to brake or to stop the vehicle 100 by means of the actuator 122, or to steer it in a different direction and thus to prevent a collision of the vehicle 100 with the object 112, in this case a pedestrian.

According to one exemplary embodiment, the control device 102 is designed to recognize an interfering ultrasonic signal 126 on the basis of the sensor data 116 and of the classifier. This refers to an ultrasonic signal that does not originate from the ultrasonic sensor 104, but that is contained in external noise in the close surroundings of the vehicle 100. The sensor data 116 is entered for this purpose into the classifier for semantic classification. In the example shown in FIG. 1, the classifier outputs further object information that assigns the sensor data 116 that has been input to a "passive interfering signal" object class. It is, however, also possible, that the classifier, depending on its training, performs an even more precise semantic classification. For example, the classifier can also assign the sensor data 116 that has been input to a "truck" object class on the basis of the interfering ultrasonic signal 126 it contains, as is suggested by way of example in FIG. 1.

A classification of a road condition is, alternatively, also possible on the basis of the sensor data 116. For this purpose, the fact that objects give rise to different ultrasonic noise depending on whether they are moving on dry or wet ground is exploited. Thus, for example, a vehicle passing by on a wet road generates additional noise in a frequency range that is detectable by the ultrasonic sensor 104 that enables a distinction to be made from a vehicle moving on a dry roadway.

Figure 2:
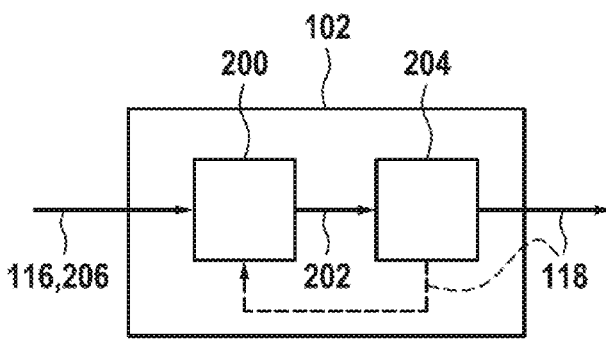
FIG. 2 shows a block diagram of a control device according to one form of embodiment of the disclosure.

FIG. 2 shows a block diagram of the control device 102 according to one exemplary embodiment of the disclosure. The control device 102 comprises an evaluation unit 200 that receives the sensor data 116 from the ultrasonic sensor 104 and generates classification data 202 therefrom. The classification data 202 are entered into a classifier unit 204 on which the classifier for semantic classification of the classification data 202 is executed. As a result of the semantic classification, the classifier unit 204 outputs the object information 118.

The classification data 202 contain echo and/or position data, as is described in more detail below.

According to one exemplary embodiment, the evaluation unit 200 receives the object information 118 from the classifier unit 204. The evaluation unit 200 is configured here to evaluate further sensor data 206 that are generated by the ultrasonic sensor 104 on the basis of the object information 118. In particular, the evaluation unit 200 uses the object information 118 to mask out the interfering ultrasonic signal 126 from the further sensor data 206, as has already been described above. In this example, the object information 118 reports the interfering ultrasonic signal 126, for example a venting noise from a truck brake, that can appropriately be taken into consideration, in particular masked out, in the evaluation of the further sensor data 206 by the evaluation unit 200.

Figure 3:
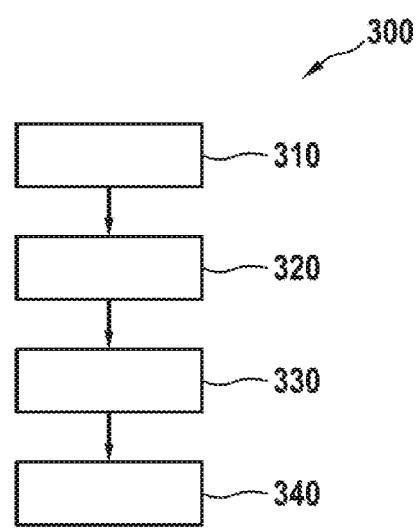
FIG. 3 shows a flow diagram of a method according to one form of embodiment of the disclosure.

FIG. 3 shows a flow diagram of a method 300 according to one form of embodiment of the disclosure. The method 300 can, for example, be carried out by the control device 102 described with reference to FIGS. 1 and 2.

The sensor data 116 are here received in a first step 310. The classification data 202 are generated from the sensor data 116 in a second step 320. The classification data 202 are entered in a third step 330 into the classifier, wherein the classifier has been trained with suitable training data, for example through supervised learning. The object information 118 is finally output in a fourth step 340.

According to one exemplary embodiment, the sensor data 116 are preprocessed in a first processing step, for example through preprocessing or filtering, and echo distances of individual receiver sensors of the ultrasonic sensor 104 are calculated from the respective signal transit times. In addition to the echo distances, transmitter IDs and receiver IDs, values or features that are useful for the classification are optionally extracted, such as for example an echo amplitude as a measure for the energy of an echo 114, a significance as a measure for the reliability of an echo 114, a trace probability that indicates the probability with which a measured echo 114 can be assigned to previous measurements, or a trace ID. Information that is generated in this first processing step can also be referred to as echo data.

In a second processing step the positions of measured reflection points are calculated from the echo data by means of multi-echo triangulation. Depending on whether the sensor data 116 are generated by way of a sensor array arranged as a single row or as two rows, either just x-positions and y-positions, or also z-positions as height information, of the reflection points are determined. Errors or variances can here also be assigned to the respective positions. It is additionally possible to extract probabilities related to the presence of the reflection points (existence probability), probabilities relating to the height information (height probability) and/or a reflection point type (reflex point type), such as complete, horizontal or vertical trilateration. The information generated in this second processing step can also be referred to as position data.

The echo data and/or the position data can be generated with or without temporal variation.

The first processing step and the second processing step can be partial steps of the step 320 of the method 300.

A combination of echo data and position data is, for example, entered into the classifier in step 330. This enables an effective semantic classification of ultrasonic signals, which permits a distinction between different object classes.

According to one exemplary embodiment, the classification data 202 are measured or calculated in regular, short time intervals of, for example, 0.02 to 0.04 seconds. The classification data 202 are thereby described as a function of time. A corresponding temporal progression of the classification data 202 is used, in a combination or weighting adapted to the particular case, as the input for the classifier. It is also possible to use a result of a current (single) measurement or, in addition or alternatively, a history progression over the last n cycles, perhaps with n=10, 20, . . . for the classification.

In step 340, the classifier outputs a prognosis or probability that indicates whether at that particular time a relevant object different from the background has been detected and, if yes, the object class, such as pedestrian, automobile, wall or pillar, to which this object belongs.

Depending on the form of embodiment, a single-stage, multi-label classifier with simultaneous classification of individual object classes, or a multi-stage method, is employed as the detection algorithm. The multi-stage method can either take place serially by way of an initial "background"/"signal" query, with a subsequent distinction of cases between individual signal types such as pedestrian, automobile or wall, or can take place in parallel by way of a binary prediction for each single signal type.

In the simplest case, the classification takes place on the basis of a comparison of individual features with prespecified definitions, typically based on a mono-parametric comparison (e.g.: "Which x, y or z positions, or which echo amplitude values, are expected in each case for a pedestrian, an automobile or a wall?").

According to a further exemplary embodiment, a CNN structure (CNN=convolutional neural network) with two-dimensional input similar to a grid is used as the classifier. Features extracted from the sensor data 116 are here represented on a vertical axis, and their temporal progression on a horizontal axis. This classifier is altogether robust, and has a high sensitivity, since each individual feature is separately treated as a two-dimensional input. In order to be able to detect patterns that occur over time without excessive delays in the prediction, time spans of about 0.5 up to 3 seconds are considered.

CNN structures have the advantage that very complex structures can be learned with them. Correspondingly large data sets with high variability are, however, required for this purpose.

Alternatively or in addition, at least one of the following classifiers can be employed: Bayes classifier, support vector machine (SVM), k-nearest-neighbor (k-NN), decision tree (e.g. random forest). These classifiers require significantly lower computing effort and less extensive training data. A preceding clustering that groups together the individual available features from the echo and position data that can be assigned respectively to the same instance, a coherent object, is however necessary here for the input calculation. The input values for the classifier are then generated from the total number of samples belonging to one cluster. Possible input values are, for example, the number, maximum, minimum, mean value, standard deviation, radius of a fitted circle, or target density of the individual features of a cluster.

It is, finally, to be noted that terms such as "comprising", "consisting of" etc. do not exclude other elements or steps, and that terms such as "a" or "one" do not exclude a plurality. Reference signs in the claims are not to be deemed restrictive.

What is claimed is:

1. A method for recognizing an object in a surroundings of a vehicle comprising an ultrasonic sensor for monitoring the surroundings of the vehicle and for transmitting and receiving ultrasonic signals, the method comprising:

receiving passive ultrasonic signals with the ultrasonic sensor, the passive ultrasonic signals do not originate from the ultrasonic sensor;

generating ultrasonic sensor data with the ultrasonic sensor based on the received passive ultrasonic signals;

receiving the ultrasonic sensor data generated by the ultrasonic sensor with a control device of the vehicle;

generating classification data that contain features to be classified based on only the ultrasonic sensor data using an evaluation unit of the control device, the classification data including echo data and/or position data;

entering the classification data and/or the ultrasonic sensor data into a classifier unit of the control device;

assigning the classification data and/or the ultrasonic sensor data to at least one object class to generate object information using the classifier unit, the at least one object class corresponding to the recognized object; and outputting the object information from the control device, wherein the passive ultrasonic signals include noises in the surroundings of the vehicle, and wherein the object information identifies when a road on which the vehicle is driving is a wet road and when the road on which the vehicle is driving is a dry road.

2. The method according to claim 1, further comprising: generating the ultrasonic sensor data with the ultrasonic sensor based on echoes of transmitted ultrasonic signals, wherein the echo data is based on the echoes of transmitted ultrasonic signals, and the position data is based on reflection sites at which the echoes of transmitted ultrasonic signals were reflected.

3. The method according to claim 2, wherein:

the echo data is further based on a transit distance, an intensity, and/or a plausibility of the echoes of transmitted ultrasonic signals, and the position data is based on coordinates of the reflection sites calculated by trilateration, multilateration, and/or a plausibility of the reflection sites.

4. The method according to claim 3, wherein the at least one object class includes pedestrians, objects that can be driven over, and objects that cannot be driven over.

5. The method according to claim 1, further comprising: receiving further ultrasonic sensor data that are generated by the ultrasonic sensor; and evaluating the further ultrasonic sensor data together with the object information.

6. The method according to claim 1, further comprising: generating repeatedly the classification data at defined time intervals, recording a temporal progress of the classification data, entering the temporal progress of the classification data into the classifier unit; and/or receiving repeatedly the ultrasonic sensor data at the defined time intervals, recording a temporal progress of the ultrasonic sensor data, and entering the temporal progress of the ultrasonic sensor data into the classifier unit.

7. The method according to claim 1, further comprising: controlling the vehicle and/or at least a component of the vehicle based on the object information.

8. The method according to claim 1, wherein a computer program which, when executed on the control device, carries out the method.

9. The method according to claim 8, wherein the computer program is stored on a non-transitory machine-readable storage medium.

10. The method according to claim 1, wherein the noises in the surroundings of the vehicle include a rolling sound of tires on a wet road and/or a rolling sound of tires on a dry road.

11. The method according to claim 1, wherein:

the noises in the surroundings of the vehicle include a venting sound of a compressed air brake, wherein the object information further identifies when a truck is nearby.

12. A method for operating an ultrasonic sensor of a vehicle for monitoring a surroundings of the vehicle, the method comprising:

receiving passive ultrasonic signals with the ultrasonic sensor, the passive ultrasonic signals do not originate from the ultrasonic sensor and include noises in the surroundings of the vehicle, the passive ultrasonic signals stored as passive ultrasonic sensor data;

receiving the passive ultrasonic sensor data with a control device of the vehicle;

generating classification data that contain features to be classified based on only the passive ultrasonic sensor data using an evaluation unit of the control device; and entering the classification data and/or the passive ultrasonic sensor data into a classifier unit of the control device to identify (i) when a road on which the vehicle is driving is a wet road, and (ii) when the road on which the vehicle is driving is a dry road.

13. The method according to claim 12, wherein the noises in the surroundings of the vehicle include a rolling sound of tires on a wet road and/or a rolling sound of tires on a dry road.

14. The method according to claim 12, wherein:

the noises in the surroundings of the vehicle include a venting sound of a compressed air brake, and entering the classification data and/or the passive ultrasonic sensor data into a classifier unit of the control device further identifies when a truck is nearby.

* * * * *